(12) United States Patent
Sirola et al.

(10) Patent No.: US 11,349,228 B2
(45) Date of Patent: May 31, 2022

(54) CORROSION-PROTECTIVE JACKET FOR ELECTRODE

(71) Applicant: SHORE ACRES ENTERPRISES INC., Barrie (CA)

(72) Inventors: Brien Todd Sirola, Barrie (CA); Christopher Paul Berni, Barrie (CA); Caitlin Emma Morrissey Hughes, Barrie (CA); Donald Brien Sirola, Barrie (CA)

(73) Assignee: SHORE ACRES ENTERPRISES INC., Barrie (CA)

( * ) Notice: Subject to any disclaimer, the term of this patent is extended or adjusted under 35 U.S.C. 154(b) by 496 days.

(21) Appl. No.: 16/408,723

(22) Filed: May 10, 2019

(65) Prior Publication Data

US 2019/0273330 A1    Sep. 5, 2019

Related U.S. Application Data

(62) Division of application No. 15/841,434, filed on Dec. 14, 2017, now Pat. No. 10,333,234.

(Continued)

(51) Int. Cl.
*H01R 4/66* (2006.01)
*H01B 7/28* (2006.01)
(Continued)

(52) U.S. Cl.
CPC ............. *H01R 4/66* (2013.01); *C04B 14/022* (2013.01); *C04B 26/02* (2013.01); *C04B 28/04* (2013.01); *C08J 5/18* (2013.01); *C08K 3/04* (2013.01); *C08K 3/041* (2017.05); *C08K 7/06* (2013.01); *H01B 3/18* (2013.01); *H01B 7/0009* (2013.01); *H01B 7/2806* (2013.01); *H01B 7/2825* (2013.01); *H01R 13/03* (2013.01);

(Continued)

(58) Field of Classification Search
None
See application file for complete search history.

(56) References Cited

U.S. PATENT DOCUMENTS

| 2,196,172 A | 6/1837 | Billings et al. |
| 1,661,712 A | 3/1928 | Wagner |

(Continued)

FOREIGN PATENT DOCUMENTS

| EP | 0100170 B1 | 10/1986 |
| GB | 1424162 A | 2/1976 |

(Continued)

OTHER PUBLICATIONS

Electrically Conductive Adhesives—Henkel, https://www.henkel-adhesives.com/US/en/products/industrial-adhesives/electrically-conductive-adhesives.html.

*Primary Examiner* — Joseph D Anthony
(74) *Attorney, Agent, or Firm* — ABM Intellectual Property Inc.; Adrienne Bieber McNeil

(57) ABSTRACT

An electrical grounding assembly includes an electrically conductive metal grounding plate, and a corrosion-protective jacket enclosing the grounding plate. The jacket is electrically conductive and water impermeable. The electrical grounding assembly further includes an electrically conductive line having a first end in electrical contact with the grounding plate and enclosed in the jacket, and an opposed second end outside of the jacket for connection to a structure to be electrically grounded.

16 Claims, 4 Drawing Sheets

Related U.S. Application Data

(60) Provisional application No. 62/545,077, filed on Aug. 14, 2017.

(51) Int. Cl.

| | | |
|---|---|---|
| *C04B 26/02* | (2006.01) | |
| *H01B 3/18* | (2006.01) | |
| *H01B 7/00* | (2006.01) | |
| *H01B 7/282* | (2006.01) | |
| *H01R 13/03* | (2006.01) | |
| *C04B 28/04* | (2006.01) | |
| *C04B 14/02* | (2006.01) | |
| *C08J 5/18* | (2006.01) | |
| *C08K 3/04* | (2006.01) | |
| *C08K 7/06* | (2006.01) | |
| *C04B 111/94* | (2006.01) | |
| *C04B 111/00* | (2006.01) | |
| *C04B 111/27* | (2006.01) | |

(52) U.S. Cl.
CPC . *C04B 2111/00525* (2013.01); *C04B 2111/27* (2013.01); *C04B 2111/94* (2013.01); *C08J 2309/08* (2013.01); *C08K 3/042* (2017.05); *C08K 3/046* (2017.05); *C08K 2201/001* (2013.01)

(56) References Cited

U.S. PATENT DOCUMENTS

| | | |
|---|---|---|
| 2,495,466 A | 1/1950 | Miller |
| 2,553,654 A | 5/1951 | Heise |
| 3,072,558 A | 1/1963 | Myers et al. |
| 3,243,753 A * | 3/1966 | Kohler ............... H05B 3/00 338/31 |
| 3,334,040 A | 8/1967 | Conrad et al. |
| 3,573,427 A | 4/1971 | Minsk |
| 3,616,354 A | 10/1971 | Russell |
| 3,716,649 A | 2/1973 | Walker et al. |
| 3,725,669 A | 4/1973 | Tatum |
| 3,725,699 A | 4/1973 | Pascoe |
| 3,876,819 A | 4/1975 | Boyd et al. |
| 3,917,781 A | 11/1975 | Gabriel et al. |
| 3,927,163 A | 12/1975 | Gabriel et al. |
| 3,941,918 A | 3/1976 | Nigol et al. |
| 3,962,142 A | 6/1976 | Freeman et al. |
| 4,017,569 A | 4/1977 | Hass |
| 4,018,715 A | 4/1977 | Tatum |
| 4,144,077 A | 3/1979 | Gallus |
| 4,170,532 A | 10/1979 | Tatum |
| 4,175,021 A | 11/1979 | Tatum et al. |
| 4,192,963 A | 3/1980 | Koehmstedt |
| 4,367,168 A * | 1/1983 | Kelly ............... H01B 1/24 252/511 |
| 4,400,259 A | 8/1983 | Schutt |
| 4,407,676 A | 10/1983 | Restrepo |
| 4,414,030 A | 11/1983 | Restrepo |
| 4,442,903 A | 4/1984 | Schutt et al. |
| 4,544,464 A | 10/1985 | Bianchi et al. |
| 4,710,644 A | 12/1987 | Baach |
| 4,786,388 A | 11/1988 | Tatum, Jr. |
| 4,799,959 A | 1/1989 | Fourez et al. |
| 4,818,439 A * | 4/1989 | Blackledge ............... H01C 7/027 252/511 |
| 4,871,395 A | 10/1989 | Sugama |
| 4,908,157 A | 3/1990 | Fontana et al. |
| 5,026,468 A | 6/1991 | Carpenter et al. |
| 5,026,508 A | 6/1991 | Tatum, Jr. et al. |
| 5,040,599 A | 8/1991 | Pfalser et al. |
| 5,055,166 A | 10/1991 | Schutt |
| 5,070,597 A | 12/1991 | Holt et al. |
| 5,080,773 A | 1/1992 | Tatum, Jr. et al. |
| 5,098,771 A | 3/1992 | Friend |
| 5,139,634 A | 8/1992 | Carpenter et al. |
| 5,143,649 A * | 9/1992 | Blackledge ............ H01C 7/027 252/511 |
| 5,167,710 A | 12/1992 | Leroux et al. |
| 5,174,871 A | 12/1992 | Russell |
| 5,207,530 A | 5/1993 | Brooks et al. |
| 5,254,228 A | 10/1993 | Westhof et al. |
| 5,294,396 A | 3/1994 | Dressel et al. |
| 5,370,783 A | 12/1994 | Carlson et al. |
| 5,413,689 A | 5/1995 | Nora et al. |
| 5,447,564 A * | 9/1995 | Xie ............ C04B 28/02 106/644 |
| 5,476,612 A * | 12/1995 | Wessling ............ C08K 3/04 252/511 |
| 5,507,933 A | 4/1996 | Nora et al. |
| 5,525,208 A * | 6/1996 | Pritula .............. C23F 13/08 205/724 |
| 5,547,311 A | 8/1996 | Kenda |
| 5,550,176 A | 8/1996 | Lewis et al. |
| 5,609,748 A | 3/1997 | Kotowski et al. |
| 5,700,398 A | 12/1997 | Angelopoulos et al. |
| 5,753,861 A | 5/1998 | Hansen et al. |
| 5,908,584 A | 6/1999 | Bennett |
| 5,976,419 A | 11/1999 | Hawkins et al. |
| 6,022,469 A | 2/2000 | Page |
| 6,121,543 A | 9/2000 | Hallmark |
| 6,193,443 B1 | 2/2001 | Trudeau et al. |
| 6,193,857 B1 | 2/2001 | Davison et al. |
| 6,303,017 B1 | 10/2001 | Page et al. |
| 6,821,336 B1 | 11/2004 | Ramme et al. |
| 7,186,321 B2 | 3/2007 | Benham |
| 7,405,247 B2 * | 7/2008 | Sachdev ............... H01L 23/433 523/457 |
| 7,422,789 B2 | 9/2008 | Avakian et al. |
| 7,540,776 B2 | 6/2009 | Graeve et al. |
| 7,578,910 B2 | 8/2009 | Sirola et al. |
| 7,619,161 B2 | 11/2009 | Okabayashi et al. |
| 7,745,528 B2 | 6/2010 | Prud'Homme et al. |
| 7,794,626 B2 | 9/2010 | Horton |
| 8,081,415 B2 | 12/2011 | Nolletti |
| 9,252,503 B2 | 2/2016 | Nolletti |
| 10,109,392 B2 | 10/2018 | Maunder et al. |
| 10,280,580 B1 | 5/2019 | Goff et al. |
| 10,433,371 B2 | 10/2019 | Miller |
| 2002/0162484 A1 | 11/2002 | Ramme et al. |
| 2004/0099982 A1 | 5/2004 | Sirola et al. |
| 2005/0194576 A1 | 9/2005 | Sirola et al. |
| 2007/0187854 A1 | 8/2007 | Sirola et al. |
| 2008/0217041 A1 | 9/2008 | Kim |
| 2009/0233470 A1 | 9/2009 | Kim |
| 2010/0159148 A1 | 6/2010 | Hagens et al. |
| 2013/0048917 A1 | 2/2013 | Virtanen et al. |
| 2013/0168126 A1 * | 7/2013 | Kuchta .............. H01B 7/361 174/102 SC |
| 2014/0251793 A1 | 9/2014 | Funahashi et al. |
| 2015/0028247 A1 | 1/2015 | Peters |
| 2015/0133593 A1 * | 5/2015 | kissell ............... C08K 3/041 524/496 |
| 2015/0282471 A1 | 10/2015 | Lampman et al. |
| 2016/0115293 A1 * | 4/2016 | Aksay ............ C08K 3/04 524/496 |
| 2016/0163419 A1 * | 6/2016 | Sirola ............... C09D 5/08 428/323 |
| 2019/0256670 A1 * | 8/2019 | Konno ............... C08C 1/14 |

FOREIGN PATENT DOCUMENTS

| | | |
|---|---|---|
| JP | 05198321 A | 8/1993 |
| KR | 101089543 B1 | 12/2011 |
| WO | 1997014196 A1 | 4/1997 |
| WO | 1997032936 A1 | 9/1997 |

* cited by examiner

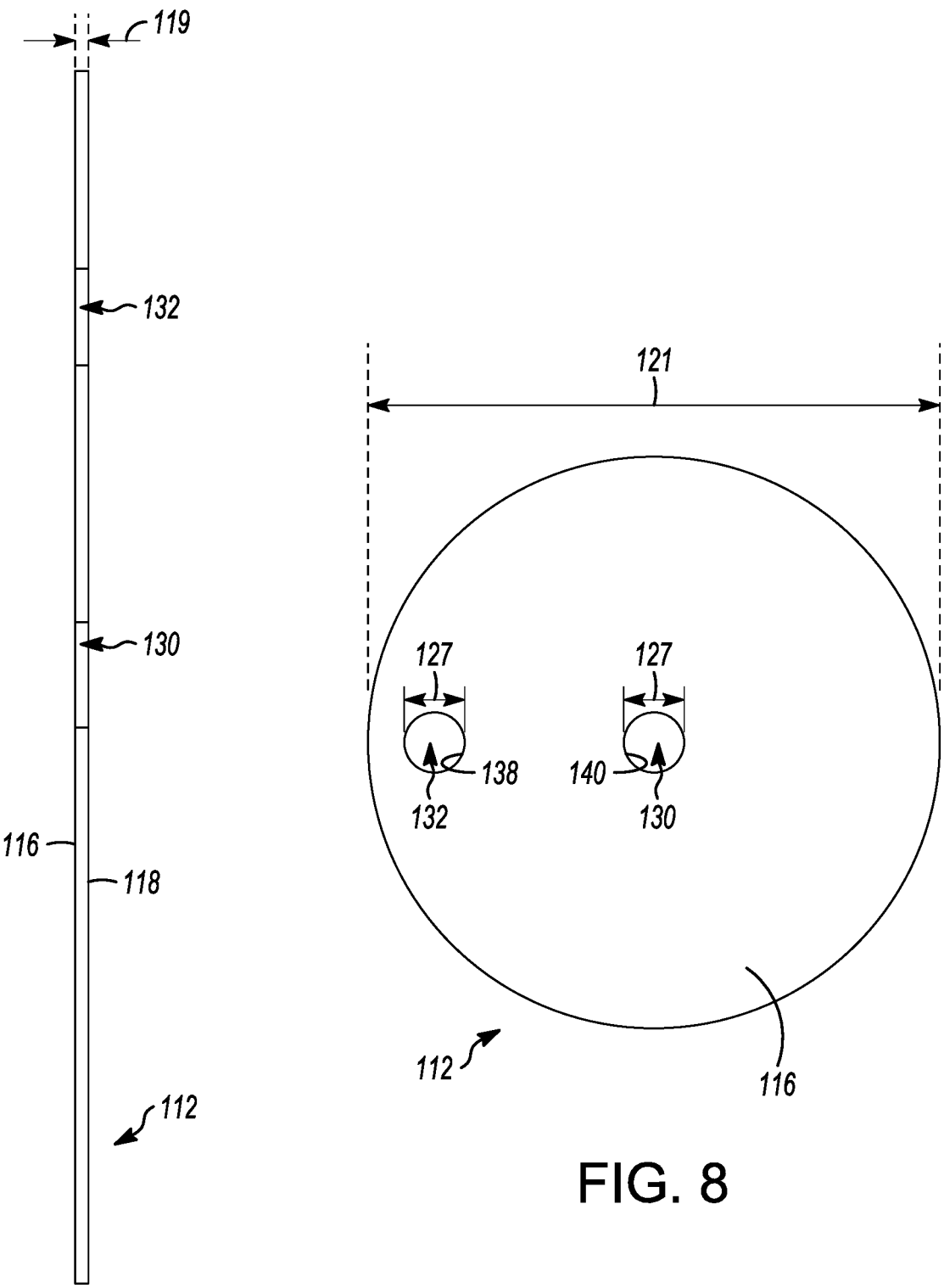

CORROSION-PROTECTIVE JACKET FOR ELECTRODE

CROSS-REFERENCES TO RELATED APPLICATIONS

This application is a divisional application of U.S. patent application Ser. No. 15/831,434, filed on Dec. 14, 2017, which claims the benefit of U.S. Provisional Patent Application No. 62/545,077, filed on Aug. 14, 2017, both of which are incorporated herein by reference in their entirety.

FIELD

This document relates to electrodes, such as buried grounding electrodes. More specifically, this document relates to corrosion protection of such electrodes.

BACKGROUND

US Patent Application Publication No. US2016/0163419 (Sirola et al.) discloses a method for protecting a conductive metal from corrosion, including coating the conductive metal with a water impermeable carbonaceous conductive material to protect the conductive metal from corrosion.

SUMMARY

The following summary is intended to introduce the reader to various aspects of the detailed description, but not to define or delimit any invention.

An electrical grounding assembly is disclosed. In some aspects, the electrical grounding assembly includes an electrically conductive metal grounding plate, and a corrosion-protective jacket enclosing the grounding plate. The jacket is electrically conductive and water impermeable. The electrical grounding assembly further includes an electrically conductive line having a first end in electrical contact with the grounding plate and enclosed in the jacket, and an opposed second end outside of the jacket for connection to a structure to be electrically grounded.

In some examples, the grounding plate has a plate first face and an opposed plate second face, and a plate thickness defined therebetween. The jacket may have a jacket first inner face in contact with the plate first face, a jacket first outer face opposed to the jacket first inner face, and a jacket first thickness extending between the jacket first inner face and the jacket first outer face. The jacket first thickness may be greater than the plate thickness. For example, the jacket first thickness may be between 1.5 times and 10 times greater than the plate thickness. In some examples, the jacket first thickness is between 0.5 inches and 1.5 inches, and the plate thickness is between 0.05 inches and 1 inch.

In some examples, the grounding plate is a steel plate. The steel plate may be galvanized.

In some examples, the grounding plate has at least a first plate through-hole, and the jacket has at least a first jacket through-hole, and the plate through-hole and the jacket through-hole are concentric. The plate through-hole may have a plate through-hole diameter, the jacket through-hole may have a jacket through-hole diameter, and the jacket through-hole diameter may be less than the plate through-hole diameter.

In some examples, the electrically conductive line is a copper wire, a copper-coated or copper-clad steel wire, a bare steel wire, or an aluminum wire.

In some examples, the jacket includes a polymeric matrix, and a particulate carbonaceous material dispersed in the polymeric matrix. The polymeric matrix may be or may include a latex, and/or a thermosetting material, and/or a thermoplastic material. The particulate carbonaceous material may be or may include a coke (such as a calcined fluid coke, and/or a calcined petroleum coke, and/or a metallurgical coke), and/or a carbon black, and/or a carbon fibre, and/or graphite, and/or carbon nanotubes.

In some examples, the jacket further includes a surfactant. The surfactant may be or may include a polymerization anionic surfactant. The surfactant may be or may include ammonium alkyl ether sulfate.

In some examples, the jacket further includes a curing agent for the polymeric matrix. The curing agent may be or may include a cement. The cement may be or may include a Portland cement. The curing agent may be or may include a cross-linking agent. The cross-linking agent may be or may include peroxide and/or a catalyst.

An electrically grounded system is also disclosed. In some aspects, the electrically grounded system includes a utility pole having a bottom portion buried in the earth and an opposed top portion above the earth. An electrical grounding assembly is secured to the bottom portion of the utility pole and is buried in the earth. The electrical grounding assembly includes an electrically conductive metal grounding plate and a corrosion-protective jacket enclosing the grounding plate. The jacket is electrically conductive and water impermeable. The system further includes an electrically conductive line having a first end in electrical contact with the grounding plate and enclosed in the jacket, and an opposed second end electrically connected to a power system neutral of the utility pole.

In some examples, the grounding plate has a plate first face and an opposed plate second face, and a plate thickness defined therebetween. The jacket may have a jacket first inner face in contact with the plate first face, a jacket first outer face opposed to the jacket first inner face and in contact with the utility pole, and a jacket first thickness extending between the jacket first inner face and the jacket first outer face. The jacket first thickness may be greater than the plate thickness. For example, the jacket first thickness may be between 1.5 times and 10 times greater than the plate thickness. In some examples, the jacket first thickness is between 0.5 inches and 1.5 inches, and the plate thickness is between 0.05 inches and 1 inch.

In some examples, the grounding plate is a steel plate. The steel plate may be galvanized.

In some examples, the grounding plate has at least a first plate through-hole extending therethrough, and the jacket has at least a first jacket through-hole extending therethrough. The plate through-hole and the jacket through-hole may be concentric. The plate through-hole may have a plate through-hole diameter, and the jacket through-hole may have a jacket through-hole diameter. The jacket through-hole diameter may be less than the plate through-hole diameter.

In some examples, the system further includes at least one fastener extending through the plate through-hole and the jacket through-hole and into the bottom portion of the utility pole.

In some examples, the electrically conductive line is a copper wire, a copper-coated or copper-clad steel wire, a bare steel wire, or an aluminum wire.

In some examples, the jacket includes a polymeric matrix, and a particulate carbonaceous material dispersed in the matrix. The polymeric matrix may be or may include a latex, and/or a thermoplastic material, and/or a thermosetting material. The particulate carbonaceous material may be or may include a coke (such as a calcined fluid coke and/or a calcined petroleum coke, and/or a metallurgical coke), and/or a carbon black, and/or a carbon fibre, and/or graphite, and/or carbon nanotubes.

In some examples, the jacket further includes a surfactant. The surfactant may be or may include a polymerization anionic surfactant. The surfactant may be or may include ammonium alkyl ether sulfate.

In some examples, the jacket further includes a curing agent for the polymeric matrix. The curing agent may be or may include a cement, such as Portland cement. The curing agent may be or may include a cross-linking agent. The cross-linking agent may be or may include peroxide and/or a catalyst.

In some examples, the system further includes an electrically conductive backfill buried in the earth. The bottom portion of the utility pole and the electrical grounding assembly may be embedded in the electrically conductive backfill.

A material for forming a corrosion-protective jacket for a buried metallic component is disclosed. In some aspects, the material includes a polymeric matrix, a particulate carbonaceous material dispersed in the polymeric matrix, a surfactant, and a curing agent.

In some examples, the polymeric matrix makes up between 10 wt % and 50 wt % of the material. In some examples, the polymeric matrix makes up between 25 wt % and 30 wt % of the material. In some examples, the polymeric matrix makes up between 10 wt % and 90 wt % of the material. In some examples, the polymeric matrix makes up between 50 wt % and 60 wt % of the material.

In some examples, the particulate carbonaceous material makes up between 50 wt % and 90 wt % of the material. In some examples, the particulate carbonaceous material makes up between 65 wt % and 70 wt % of the material. In some examples, the particulate carbonaceous material makes up between 5 wt % and 80 wt % of the material. In some examples, the particulate carbonaceous material makes up between 35 wt % and 45 wt % of the material.

In some examples, the surfactant makes up between 0.01 wt % and 0.5 wt % of the material. In some examples, the surfactant makes up between 0.02 wt % and 0.1 wt % of the material.

In some examples, the curing agent makes up between 0.01 wt % and 8 wt % of the material. In some examples, the curing agent makes up between 2.0 wt % and 4.0 wt % of the material.

In some examples, the material further includes water. The water may make up between 0.1 wt % and 10 wt % of the material.

In some examples, the polymeric matrix includes or is a latex, and/or a thermoplastic material, and/or a thermoset material.

In some examples, the particulate carbonaceous material includes or is a coke (such as a calcined fluid coke, and/or a calcined petroleum coke, and/or a metallurgical coke), and/or a carbon black, and/or a carbon fibre, and/or graphite, and/or carbon nanotubes.

In some examples, the surfactant includes or is a polymerization anionic surfactant, such as ammonium alkyl ether sulfate.

In some examples, the curing agent includes or is a cement, such as a Portland cement. The curing agent may be or may include a cross-linking agent. The cross-linking agent may be or may include peroxide and/or a catalyst.

In some examples, the material has a water permeability of between $10^{-5}$ cm/s and $10^{-10}$ cm/s when cured. In some examples, the material has a water permeability of between $10^{-7}$ cm/s and $10^{-9}$ cm/s when cured. In some examples, the material has a water permeability of between 0.01 US Perms and 1.0 US Perms when cured.

In some examples, the material has an electrical resistivity of between 0.01 ohm·cm and 500 ohm·cm when cured. In some examples, the material has an electrical resistivity of between 15 ohm·cm and 30 ohm·cm when cured.

Another material for forming a corrosion-protective jackets for a buried metallic component is disclosed. In some aspects, the material includes a polymeric matrix; and a particulate carbonaceous material dispersed in the polymeric matrix.

In some examples, the material further includes a surfactant; and a curing agent.

In some examples, the polymeric matrix makes up between 10 wt % and 50 wt % of the material, the particulate carbonaceous material makes up between 50 wt % and 90 wt % of the material, the surfactant makes up between 0.01 wt % and 0.5 wt % of the material, and the curing agent makes up between 0.1 wt % and 8.0 wt % of the material.

In some examples, the surfactant includes a polymerization surfactant.

In some examples, the curing agent includes a cement.

In some examples, the material includes water. The water can make up between 0.1 wt % and 10 wt % of the material.

In some examples, the polymeric matrix makes up between 10 wt % and 90 wt % of the material, and the particulate carbonaceous material makes up between 5 wt % and 80 wt % of the material.

In some examples, the polymeric matrix includes a latex or a thermoplastic material or a thermoset material.

In some examples, the particulate carbonaceous material includes at least one of coke, carbon black, carbon fibre, graphite, and carbon nanotubes.

In some examples, the material has a water permeability of between $10^{-5}$ cm/s and $10^{-10}$ cm/s, or between 0.01 US Perms and 1.0 US Perms, and the material has an electrical resistivity of between 0.01 ohm·cm and 500 ohm·cm.

Also disclosed is a corrosion-protective jacket made by curing the above-mentioned material.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 7 is a side view of the grounding plate of the electrical grounding assembly of FIGS. 3 to 6; and FIG. 8 is a top view of the grounding plate of FIG. 7.

DETAILED DESCRIPTION

Figure 1:
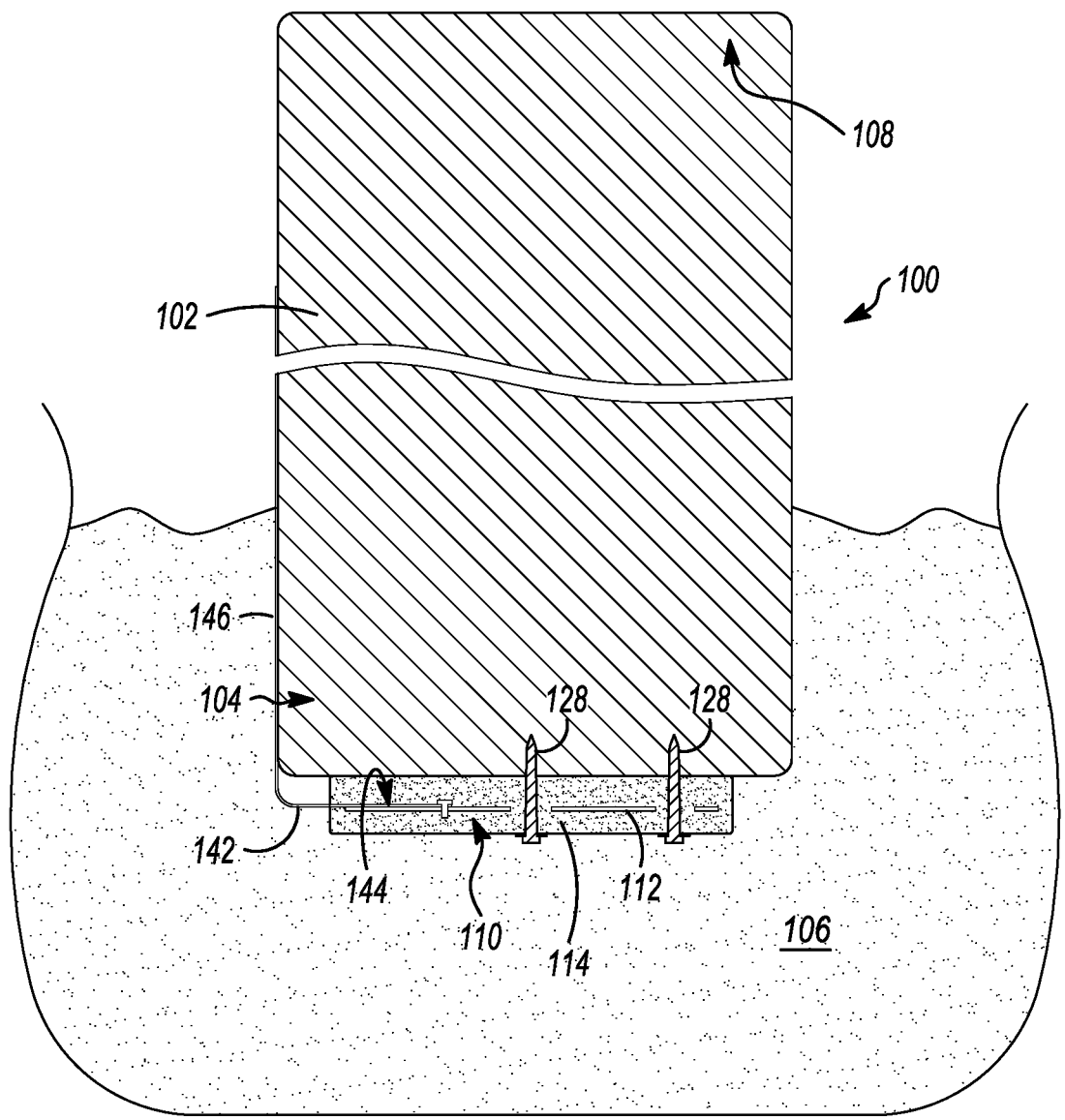
FIG. 1 is a partial sectional view, showing an electrically grounded system including a utility pole and an electrical grounding assembly.

Various apparatuses or processes will be described below to provide an example of an embodiment of the claimed subject matter. No embodiment described below limits any claim and any claim may cover processes or apparatuses that differ from those described below. The claims are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

In general, disclosed herein is a corrosion-protective jacket for a buried metallic structure. The buried metallic structure may be, for example, an electrically conductive metal grounding plate, and the corrosion-protective jacket may enclose the grounding plate.

The corrosion-protective jacket and the grounding plate may together form an electrical grounding assembly. The electrical grounding assembly may be electrically connected to a structure that is to be electrically grounded (e.g. to the power system neutral conductor on a structure that is to be electrically grounded). The structure may be, for example, a utility pole, such as a wood, steel, cement, or composite pole used in the electrical distribution and transmission industry, or another piece of equipment used in the electrical distribution and transmission industry. The electrical grounding assembly may be buried in the earth and secured to a buried end of the structure.

The corrosion-protective jacket may be electrically conductive, so that electricity can be dissipated from the grounding plate to the earth. Furthermore, the corrosion-protective jacket may be water-impermeable, to protect the grounding plate from galvanic corrosion. Due to the corrosion-protective jacket, such an assembly may have a relatively long service life, for example as long as the service life of the structure, such as up to 30 years, or up to 60 years, or up to 100 years.

As used herein, the term 'jacket' refers to a solid product that encloses a substrate product (e.g. a grounding plate), and is in contact with the substrate product, for example over all or a majority of the surface area of the substrate product. Furthermore, the term 'jacket' refers to a product that is relatively thick, i.e. is thicker than a paint. Jackets may be formed separately from substrate products and then applied to substrate products, or may be formed directly on to the substrate products. Jackets may in some examples have some structural integrity. That is, a jacket may retain its form even when standing alone, separate from a substrate. Jackets differ from paints or coatings in that jackets are thicker than paints or coatings, and in that paints and coatings cannot typically be formed separately from substrate products and do not typically have any structural integrity on their own. It has been determined that the use of a jacket as disclosed herein, as opposed to a paint or coating, can provide a substrate material with enhanced corrosion protection, while still allowing for the substrate material to serve as a grounding electrode.

As will be described in further detail below, the corrosion-protective jacket may in some examples be formed from a material that includes a polymeric matrix, and a particulate carbonaceous material dispersed in the polymeric matrix. The polymeric matrix may provide the jacket with sufficient water impermeability to protect a substrate from corrosion, and the particulate carbonaceous material may provide the jacket with sufficient electrical conductivity to allow the substrate to be electrically grounded when buried. It has been determined that the polymeric matrix and the particulate carbonaceous material provide enhanced corrosion protection when provided in the form of a jacket, rather than a coating.

Production of a thick jacket in solid form can in some examples present technical difficulties. For example, during production, a thin layer at the surface of the jacket can solidify to form a skin; however, the material beneath the skin may not solidify and may remain in a generally fluid form. This can occur particularly in cases wherein the polymeric matrix includes latex. It has been determined this can be addressed by adding a curing agent such as cement to the material. The cement can facilitate the solidification of the material through its entire thickness, via a hydration reaction.

For further example, if the jacket is particularly thick, the polymeric matrix may not cool evenly, and the jacket may sag. It has been determined that this can be addressed by using a textured surface (e.g. a waffled surface) to retain the thickness of the jacket while minimizing the amount of material in the jacket.

The jacket may in some examples include a surfactant. The surfactant may allow for ease of mixing and an even distribution of the particulate carbonaceous material in the polymeric matrix.

Figure 2:
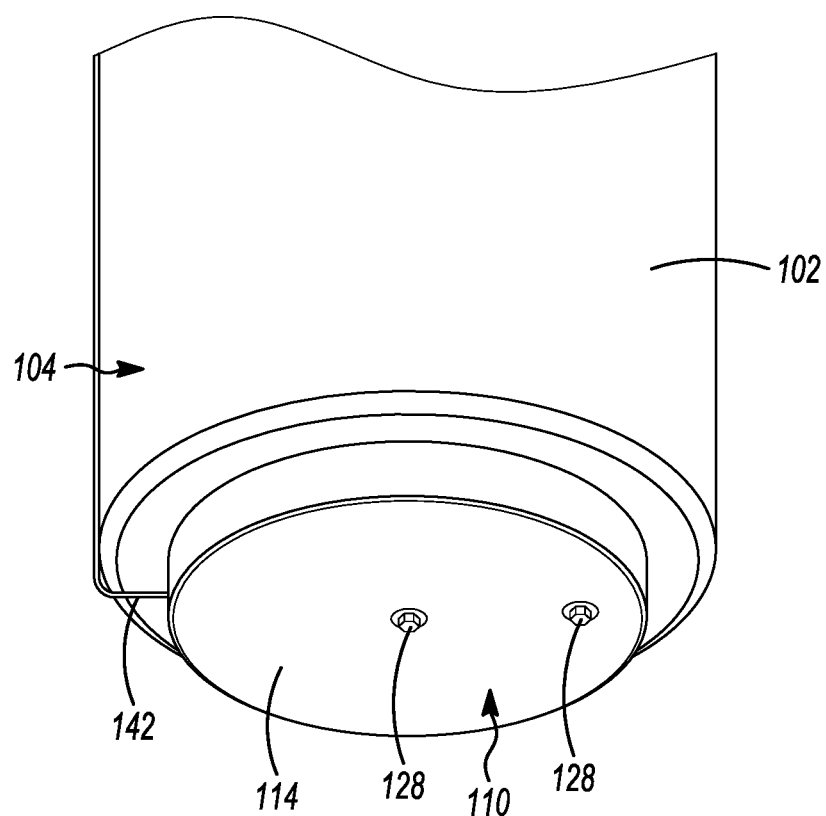
FIG. 2 is a partial perspective view of the electrical grounding assembly and utility pole of the electrically grounded system of FIG. 1.

Referring now to FIGS. 1 and 2, an example electrically grounded system 100 is shown. The system 100 includes a structure to be electrically grounded, which in the example shown is a utility pole 102. The utility pole 102 has a bottom portion 104, which is buried in the earth 106, and an opposed top portion 108 that is above the earth 106. For simplicity, the various structures that may be attached to the utility pole 102 are not shown.

Referring still to FIGS. 1 and 2, in the example shown, the system 100 further includes an electrical grounding assembly 110, which serves to electrically ground the utility pole 102. The electrical grounding assembly 110 is secured to the bottom portion 104 of the utility pole 102 and is buried in the earth 106 (the earth 106 is shown only in FIG. 1). An electrically conductive backfill (not shown) may also be buried in the earth 106, and the bottom portion 104 of the utility pole 102 and the electrically grounding assembly 110 may be embedded in the electrically conductive backfill. The electrically conductive backfill may, for example, be one sold under the name Conducrete® by SAE Inc. (Barrie, Ontario) or one sold under the name Conduflow™ by SAE Inc. (Barrie, Ontario).

Figure 3:
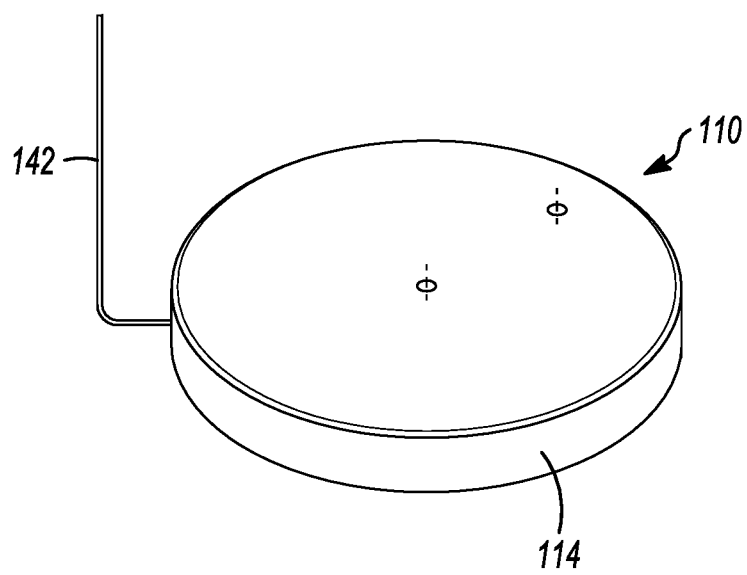
FIG. 3 is a perspective view of the electrical grounding assembly of the electrically grounded system of FIG. 1.
Figure 4:
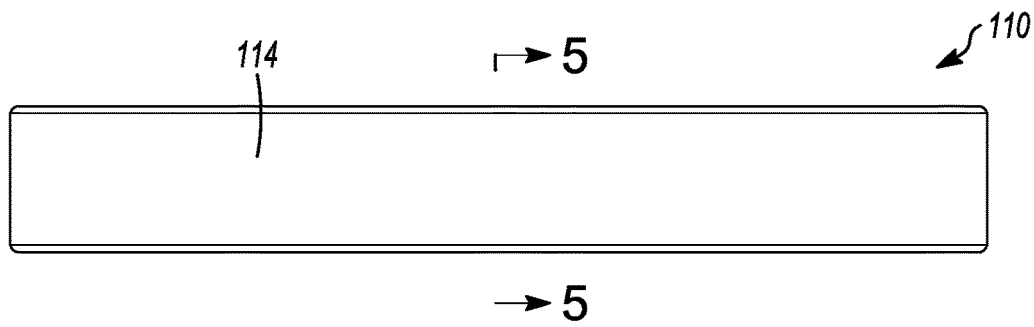
FIG. 4 is a side view of the electrical grounding assembly of FIG. 3.
Figure 5:
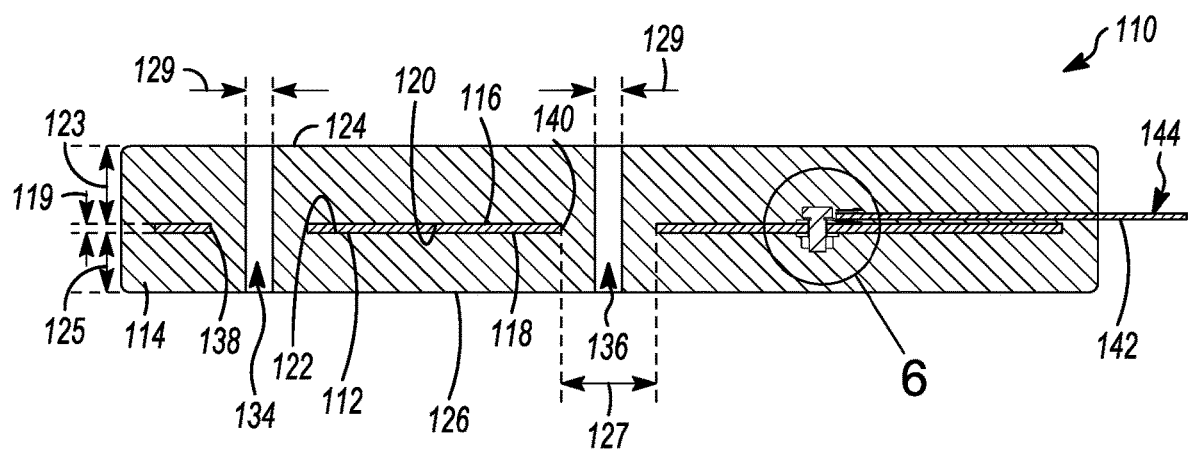
FIG. 5 is a cross-section taken along line 5-5 in FIG. 4.

Referring to FIGS. 3 to 5, in the example shown, the electrical grounding assembly 110 includes an electrically conductive metal grounding plate 112, and a corrosion-protective jacket 114 enclosing the grounding plate 112.

The grounding plate 112 may be any suitable metal. For example, the grounding plate may be a steel (e.g. stainless steel), copper, or copper-clad steel plate. In some examples, the grounding plate 112 may be galvanized steel. Galvanization of the grounding plate 112 may further protect the grounding plate 112 from galvanic corrosion. Furthermore, galvanization of the grounding plate 112 may protect the grounding plate 112 from corrosion during the application of the jacket 114 to the grounding plate 112. In some examples, the grounding plate 112 may be coated with an anti-corrosion coating, such as a zinc coating.

The jacket 114 may be both electrically conductive and water impermeable. This allows the jacket 114 to protect the grounding plate 112 from corrosion, particularly galvanic corrosion, while still allowing for the grounding plate 112 to be in electrical contact with the surrounding earth 106.

Referring to FIGS. 7 and 8, in the example shown, the grounding plate 112 is generally circular when viewed from above, and has a plate first face 116 and an opposed plate second face 118. A plate thickness 119 is defined between the plate first face and the plate second face. The plate further has a plate diameter 121.

Referring back to FIG. 5, in the example shown, the jacket 114 has a jacket first inner face 120, which is in contact with the plate first face 116, and a jacket second inner face 122, which is in contact with the plate second face 118. The jacket 114 further has a jacket first outer face 124, which is in contact with the utility pole 102 when the assembly 110 is installed to the utility pole 102, and a jacket second outer face 126. A jacket first thickness 123 extends between the jacket first inner face 120 and the jacket first outer face 124, and a jacket second thickness 125 extends between the jacket second inner face 122 and the jacket second outer face 126.

Referring still to FIG. 5, in the example shown, the plate 112 is relatively thin, and the jacket 114 is relatively thick, so that the jacket first thickness 123 and the jacket second thickness 125 are greater than the plate thickness 119. For example, the jacket first thickness 123 and/or the jacket second thickness 125 may be between 1.5 times and 10 times greater than the plate thickness 119, or between 7 and 8 times greater than the plate thickness 119. For example, the jacket first thickness 123 and jacket second thickness 125 may be between 0.1 and 1.5 inches, or between 0.5 and 1.5 inches. The plate thickness 119 may be between 0.05 inches and 0.25 inches, or in some examples up to 1 inch.

In the example shown, the jacket first thickness 123 and the jacket second thickness 125 are each about 15/16 in., and the plate thickness 119 is about 1/8 in., so that the jacket first thickness 123 and the jacket second thickness 125 are each about 7.5 times greater than the plate thickness 119. In other examples, the jacket first thickness 123 and the jacket second thickness 125 may each be about 15/16 in., and the plate thickness 119 may be about 1/4 in., so that the jacket first thickness 123 and the jacket second thickness 125 are each about 3.75 times greater than the plate thickness 119.

Referring back to FIGS. 1 and 2, in the example shown, fasteners 128 in the form of screws are used to secure the grounding assembly 110 to the utility pole 102, and the plate 112 and the jacket 114 include through-holes to accommodate the fasteners 128. Specifically, referring to FIGS. 7 and 8, the plate 112 has a first plate through-hole 130 and a second plate through-hole 132 extending therethrough, from the plate first face 116 to the plate second face 118. Referring to FIG. 5, the jacket 114 has a first jacket through-hole 136 and a second jacket through-hole 134 extending therethrough, from the jacket first outer face 124 to the jacket second outer face 126. The first plate through-hole 130 and the first jacket through-hole 136 are concentric, and the second plate through-hole 132 and the second jacket through-hole 134 are concentric. In use, one of the fasteners 128 extends through the first plate through-hole 130 and the first jacket through-hole 136, and into the bottom portion 104 of the utility pole 102, and the other fastener 128 extends through the second plate through-hole 132 and the second jacket through-hole 134, and into the bottom portion 104 of the utility pole 102.

Referring to FIG. 8, the first 130 and second 132 plate through-holes have a diameter 127 (also referred to as a 'plate through-hole diameter'). Referring to FIG. 5, the first 134 and second 136 jacket through-holes have a diameter 129 (also referred to as a 'jacket through-hole diameter'). The jacket through-hole diameter 129 is less than the plate through-hole diameter 127. As such, the circular walls 138, 140, which define the plate through-holes 130, 132, respectively, are enclosed within the jacket 114.

Figure 6:
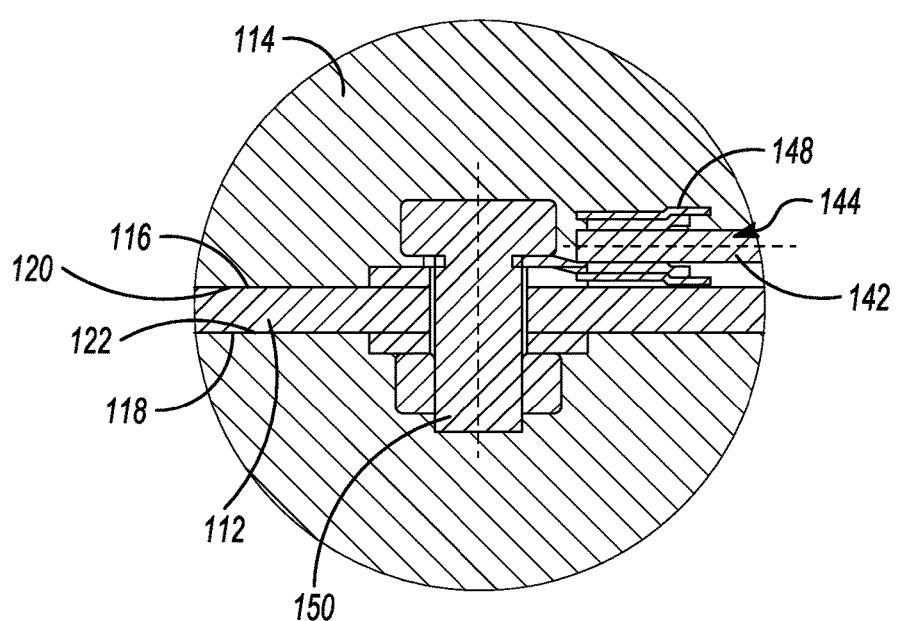
FIG. 6 is an enlarged view of the region in circle 6 in FIG. 5.

Referring to FIGS. 1, 2, and 6, in the example shown, the system 100 further includes an electrically conductive line 142. The electrically conductive line 142 helps to ensure that the grounding plate 112 is in electrical contact with the structure to be electrically grounded (e.g. via connection of the electrically conductive line 142 to the power system neutral). The electrically conductive line may be, for example, a copper wire, a copper-coated or copper-clad steel wire, a bare steel wire, or an aluminum wire.

In the example shown, the electrically conductive line 142 has a first end 144 that is in electrical contact with the grounding plate 112 and is enclosed in the jacket 114, and an opposed second end 146 outside of the jacket 114 and electrically connected to the power system neutral (not shown) of the utility pole 102. In the example shown, as shown in FIG. 6, the first end 144 is crimped to the grounding plate 112 using a wire crimp connector 148 and a bolt 150.

The electrically conductive line 142 may be considered part of the grounding assembly 110, and may be provided together with and assembled to the grounding plate 112 and jacket 114, for subsequent connection to the power system neutral of the utility pole 102. Alternatively, the electrically conductive line 142 may be considered as a separate part of the system 100, and may be provided separately from the grounding plate 112 and jacket 114.

As mentioned above, the jacket 114 may be electrically conductive and water impermeable. As used herein, the term 'electrically conductive' indicates that the jacket has an electrical resistivity of less than 500 ohm·cm. For example, the jacket may have an electrical resistivity of between 0.01 ohm·cm and 500 ohm·cm or an electrical resistivity of between 15 ohm·cm and 30 ohm·cm. Furthermore, the term 'water impermeable' indicates that the jacket has a water permeability of less than $10^{-5}$ cm/s (e.g. where the polymeric matrix is latex), or less than or equal to 1.0 US Perms (e.g. where the polymeric matrix is a thermoplastic or thermosetting material). For example, the jacket may have a water permeability of between $10^{-5}$ cm/s and $10^{-19}$ cm/s or a water permeability of between $10^{-7}$ cm/s and $10^{-9}$ cm/s. For further example, the jacket may have a water permeability of between 0.01 US Perms and 1.0 US Perms.

In some examples, in order to be sufficiently electrically conductive and water impermeable for forming a corrosion-protective jacket for a buried metallic structure, the jacket may be made from a material (referred to as a jacket material) that includes a polymeric matrix, and a particulate carbonaceous material dispersed in the polymeric matrix. The jacket material may in some examples (e.g. wherein the polymeric matrix is latex) further include a surfactant, and a curing agent. The jacket material may in some examples be cured or cross-linked to form the jacket.

In some examples, such as wherein the polymeric matrix is a latex, the polymeric matrix may make up between 10 wt % and 50 wt % of the jacket material, or between 25 wt % and 30 wt % of the jacket material. In some examples, such as wherein the polymeric matrix is a thermoplastic material or a thermoset material, the polymeric matrix may make up between 10 wt % and 90 wt % of the jacket material, or between 50 wt % and 60 wt % of the jacket material.

In some examples, such as wherein the polymeric matrix is a latex, the particulate carbonaceous material may make up between 50 wt % and 90 wt % of the jacket material, or between 65 wt % and 70 wt % of the jacket material. In some examples, wherein the polymeric matrix is a thermoset material or a thermoplastic material, the particulate carbonaceous material may make up between 5 wt % and 80 wt % of the jacket material, or between 35 wt % and 45 wt % of the jacket material In some examples, the surfactant may make up between 0.01 wt % and 0.5 wt % of the jacket material, or between 0.02 wt % and 0.1 wt % of the jacket material.

In some examples, the curing agent may make up 0.01 wt % and 8.0 wt % of the jacket material, or 2.0 wt % and 4.0 wt % of the jacket material.

In some examples, such as wherein the polymeric matrix is a latex, the remainder (e.g. between 0.1 wt % and 10 wt %, or between 2 wt % and 4 wt %) of the jacket material may be made up of water.

The polymeric matrix may include or may be a latex, a thermoplastic material, a thermosetting material, or another material or combination of materials. The latex may be or may include a styrene-butadiene emulsion, such as one sold under the brand name BarrierPro® 4550 Latex, or BarrierPro® 4555 Latex.

The particulate carbonaceous material may include or may be a coke, and/or graphite, and/or carbon black, and/or carbon fibre, and/or carbon nanotubes, and/or other carbonaceous materials or combinations thereof. The coke may be or may include a calcined fluid coke, and/or calcined petroleum coke, and/or metallurgical coke. The calcined fluid coke may be one sold by Asbury Carbons (Asbury, N.J.) under the name 251P Calcined Fluid Coke (20×200 mesh).

The surfactant may include or may be a polymerization anionic surfactant and/or a zwitterionic surfactant, and/or other surfactant or combination of surfactants. The surfactant may be one sold under the name Chemtex 2504.

The curing agent may include or may be a cement, a hydrated lime, a cross-linking agent, a slag cement, and/or another curing agent or combination of curing agents. The cement may be or may include a Portland Cement. The Portland Cement may be a Portland Limestone Cement, such as one sold by St. Mary's Cement (Toronto, Ontario) under the name, Contempra Type GUL Portland Limestone Cement. The cross-linking agent may be or may include peroxide and/or a catalyst.

In some examples, other additives may be included in the jacket formulation, such as a metal chelating agent, a processing aid, an antimicrobial additive, and/or a UV stabilizer.

The jacket material may in some examples be applied to a grounding plate by pouring into a mould, injection moulding, or spraying. The jacket material may then be cured, for example at ambient temperature or in an oven, or by cross-linking (e.g. by exposure to a radiation source such as electron beam exposure, gamma-radiation, or UV light, or by vulcanization (often called sulfur curing)).

While the above description provides examples of one or more processes or apparatuses, it will be appreciated that other processes or apparatuses may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

EXAMPLES

Four different jacket materials were prepared. The jacket materials were prepared according to the formulae shown in Tables 1 to 4.

TABLE 1

JACKET MATERIAL 1

| Component | Weight % |
|---|---|
| 251P Calcined Fluid Coke (Asbury Carbons) (20 × 200 Mesh) | 66.97 |
| BarrierPro ® 4550 Latex (Styrene-Butadiene Emulsion) | 25.73 |
| Polymerization Surfactant (Chemtex 2504) | 0.08 |
| Portland Cement (Contempra Type GUL Portland Limestone Cement, St. Mary's Cement) | 3.63 |
| Tap Water | 3.59 |

TABLE 2

JACKET MATERIAL 2

| Component | Weight % |
|---|---|
| CC60 Calcined Petroleum Coke (Oxbow Calcining LLC) | 66.05 |
| BarrierPro ® 4550 Latex (Styrene-Butadiene Emulsion) | 22.01 |
| Polymerization Surfactant (Chemtex 2504) | 0.22 |
| Portland Cement (Contempra Type GUL Portland Limestone Cement, St. Mary's Cement) | 4.02 |
| Tap Water | 7.70 |

TABLE 3

JACKET MATERIAL 3

| Component | Weight % |
|---|---|
| 251P Calcined Fluid Coke (Asbury Carbons) (20 × 200 Mesh) | 66.97 |
| BarrierPro ® 4550 Latex (Styrene-Butadiene Emulsion) | 25.73 |
| Polymerization Surfactant (Chemtex 2504) | 0.08 |
| Portland Cement (Contempra Type GUL Portland Limestone Cement, St. Mary's Cement) | 2.63 |
| Tap Water | 2.59 |

TABLE 4

JACKET MATERIAL 4

| Component | Weight % |
|---|---|
| 251P Calcined Fluid Coke (Asbury Carbons) (20 × 200 Mesh) | 60.00 |
| Polypropylene Block Copolymer LG Chem Seetec M1400 | 40.00 |

Jacket materials 1 to 3 were prepared by combining the latex and surfactant in a mixer and mixing on a low speed. The Portland Cement and water were mixed in a separate container until fully blended. The Portland Cement/water mixture was added to the Latex/Surfactant mixture and mixed further. The Calcined Fluid Coke was added and the mixture was mixed further. The mixture was poured into a mould to cover the bottom. The mould was vibrated to remove any air bubbles. A galvanized steel plate having a plate thickness of ¼ inch or ⅛ inch was inserted into the mould and centered. The remainder of the mixture was poured into the mould, and the mould was vibrated again to remove air bubbles. The assembly was cured at ambient temperature for 24-48 hours before removing from the mould. The assembly was allowed to cure for an additional 2 weeks before use. The final assembly (including the plate and the jacket) had a thickness of 2 inches.

Jacket material 4 was prepared by compounding the raw materials using a twin screw extruder. The materials were fed into the mouth of the extruder (feed zone) set to the appropriate melt temperature and mixed together. The resulting material was pelletized and then fed into an injection molding machine for processing into finished parts. In this example, the material was not cured via cross-linking, and the jackets set as they cooled back to room temperature.

It was determined that the use of a galvanized steel plate protected the plate from corrosion during the moulding process.

It was observed that the cured jacket material formed a black solid.

It was determined that the cured jacket materials had the properties shown in Table 5 to 9, respectively.

TABLE 5

PROPERTIES OF CURED JACKET MATERIAL 1

| Property | Value |
|---|---|
| Freeze-Thaw Resistance | >8 years (testing ongoing) |
| Permeability to Water | $8.75 \times 10^{-8}$ cm/s |
| Water Absorption | ~15% after 7400 hrs in room T water |
| Electrical Resistivity | 15-30 ohm · cm |
| Electrical Conductivity | 0.03-0.06 S/cm |
| Electrical Resistance | 1-3 ohms |
| Electrical Corrosion Resistance (copper) | 95%-100% |
| Compatibility (copper) | Yes |

TABLE 6

PROPERTIES OF CURED JACKET MATERIAL 2

| Property | Value |
|---|---|
| Freeze-Thaw Resistance | >8 years (testing ongoing) |
| Permeability to Water | $6.50 \times 10^{-6}$ cm/s |
| Water Absorption | ~22% after 7400 hrs in room T water |
| Electrical Resistivity | 14-25 ohm · cm |
| Electrical Conductivity | 0.04-0.08 S/cm |
| Electrical Resistance | 1-2 ohms |
| Electrical Corrosion Resistance (copper) | 95%-100% |
| Compatibility (copper) | Yes |

TABLE 7

PROPERTIES OF CURED JACKET MATERIAL 3

| Property | Value |
|---|---|
| Permeability to Water | $1.72 \times 10^{-7}$ cm/s |
| Water Absorption | ~9% after 3500 hrs in room T water |
| Electrical Resistivity | 19.68 ohm · cm |
| Electrical Conductivity | 0.05 S/cm |
| Electrical Resistance | 0.33 ohms |
| Freeze-Thaw Resistance | >8 years (testing ongoing) |
| Electrical Corrosion Resistance | |
| Copper | 95-100% |
| Steel | 95-100% |
| Galvanized Steel | 95-100% |
| Compatibility | |
| Copper | Yes |
| Steel | Yes |
| Galvanized Steel | Yes |
| Elastic Compression | 2.6 mm (5%) under a load of 12 000 kg (1.1849 MPa/171.86 psi) Sample returned to normal with no damage upon release of load |
| Maximum Loading Withstood | 16 772 kg |

TABLE 8

FAULT CURRENT TESTING OF CURED JACKET MATERIAL 3 APPLIED TO A ⅛ INCH THICK PLATE

| Test Current (A) | Resistance Before Test (mΩ) | Voltage (V) | Resistance After Test (mΩ) | Temperature Rise (° C.) | Test Duration (milliseconds) |
|---|---|---|---|---|---|
| 1000 | 30.60 | 19.50 | 20.30 | 0.45 | 500.00 |
| 2500 | 66.25 | 103.00 | 32.45 | 4.03 | 500.00 |
| 3750 | 32.45 | 365.50 | 46.10 | 12.75 | 342.50 |
| 5000 | 34.60 | 176.00 | 7.28 | 1.00 | 500.00 |

TABLE 9

PROPERTIES OF CURED JACKET MATERIAL 4

| Property | Value |
| --- | --- |
| Electrical Resistivity | 20-30 ohm · cm |
| Electrical Conductivity | 0.03-0.05 S/cm |
| Electrical Resistance | 40-60 ohms |
| Electrical Corrosion Resistance (copper) | 95%-100% |
| Compatibility (copper) | Yes |

We claim:

1. A material for forming a corrosion-protective jacket for a buried metallic component, the material comprising:
   a) a polymeric matrix, wherein the polymeric matrix makes up between 10 wt % and 50 wt % of the material;
   b) an electrically conductive particulate carbonaceous material dispersed in the polymeric matrix, wherein the particulate carbonaceous material makes up between 50 wt% and 90 wt % of the material;
   c) a surfactant, wherein the surfactant makes up between 0.01 wt % and 0.5 wt % of the material; and
   d) a curing agent, wherein the curing agent comprises a cement and makes up between 0.1 wt % and 8.0 wt % of the material.

2. The material of claim 1, wherein the surfactant comprises polymerization surfactant ammonium alkyl ether sulfate.

3. The material of claim 1, further comprising water, wherein the water makes up between 0.1 wt % and 10 wt % of the material.

4. The material of claim 1 wherein:
   a) the polymeric matrix makes up between 25 wt % and 30 wt % of the material; and
   b) the particulate carbonaceous material makes up between 65 wt % and 70 wt % of the material.

5. The material of claim 1, wherein the polymeric matrix comprises a latex or a thermoplastic material or a thermoset material.

6. The material of claim 1, wherein the particulate carbonaceous material comprises at least one of coke, carbon black, carbon fibre, graphite, and carbon nanotubes.

7. The material of claim 1, wherein:
   a) the material has a water permeability of between $10^{-5}$ cm/s and $10^{-10}$ cm/s or between 0.01 US Perms and 1.0 US Perms, and
   b) the material has an electrical resistivity of between 0.01 ohm·cm and 500 ohm·cm.

8. The material of claim 1, wherein the curing agent comprises a cross-linking agent.

9. The material of claim 8, wherein the cross-linking agent comprises at least one of a peroxide and a catalyst.

10. The material of claim 1, further comprising at least one of a metal chelating agent, a processing aid, an antimicrobial additive, and a UV stabilizer.

11. The material of claim 1, wherein the material is pourable into a mould, injection mouldable, and/or sprayable.

12. The material of claim 1, wherein the material is curable by at least one of ambient temperature curing, oven curing, and cross-linking.

13. The material of claim 12, wherein the material is cross-linkable by radiation exposure and/or vulcanization.

14. The material of claim 13, wherein the material is curable by electron beam exposure, gamma-radiation exposure, or UV light exposure.

15. The material of claim 1, wherein the cement comprises a Portland cement.

16. The material of claim 1 wherein:
   a) the polymeric matrix makes up between 20 wt % and 30 wt % of the material; and
   b) the particulate carbonaceous material makes up between 65 wt % and 75 wt % of the material.

* * * * *